No. 713,945. Patented Nov. 18, 1902.
L. P. BRECKENRIDGE & E. C. OLIVER.
RECORDING MACHINE.
(Application filed Feb. 20, 1902.)

(No Model.) 7 Sheets—Sheet 1.

Witnesses:
Jas. E. Hutchinson
Henry C. Hazard

Inventors.
L. P. Breckenridge and E. C. Oliver,
by Edwin J. Prindle,
their Attorney.

No. 713,945. Patented Nov. 18, 1902.
L. P. BRECKENRIDGE & E. C. OLIVER.
RECORDING MACHINE.
(Application filed Feb. 20, 1902.)

(No Model.) 7 Sheets—Sheet 3.

No. 713,945. Patented Nov. 18, 1902.
L. P. BRECKENRIDGE & E. C. OLIVER.
RECORDING MACHINE.
(Application filed Feb. 20, 1902.)

(No Model.) 7 Sheets—Sheet 4.

Witnesses:
Jas. E. Hutchinson
Henry C. Hazard

Inventors
L. P. Breckenridge & E. C. Oliver,
by Edwin J. Prindle,
their Attorney.

No. 713,945. Patented Nov. 18, 1902.
L. P. BRECKENRIDGE & E. C. OLIVER.
RECORDING MACHINE.
(Application filed Feb. 20, 1902.)

(No Model.) 7 Sheets—Sheet 6.

Witnesses:
Jas. E. Hutchinson
Henry C. Hazard.

Inventors.
L. P. Breckenridge & E. C. Oliver,
by Edwin J. Prindle,
their Attorney

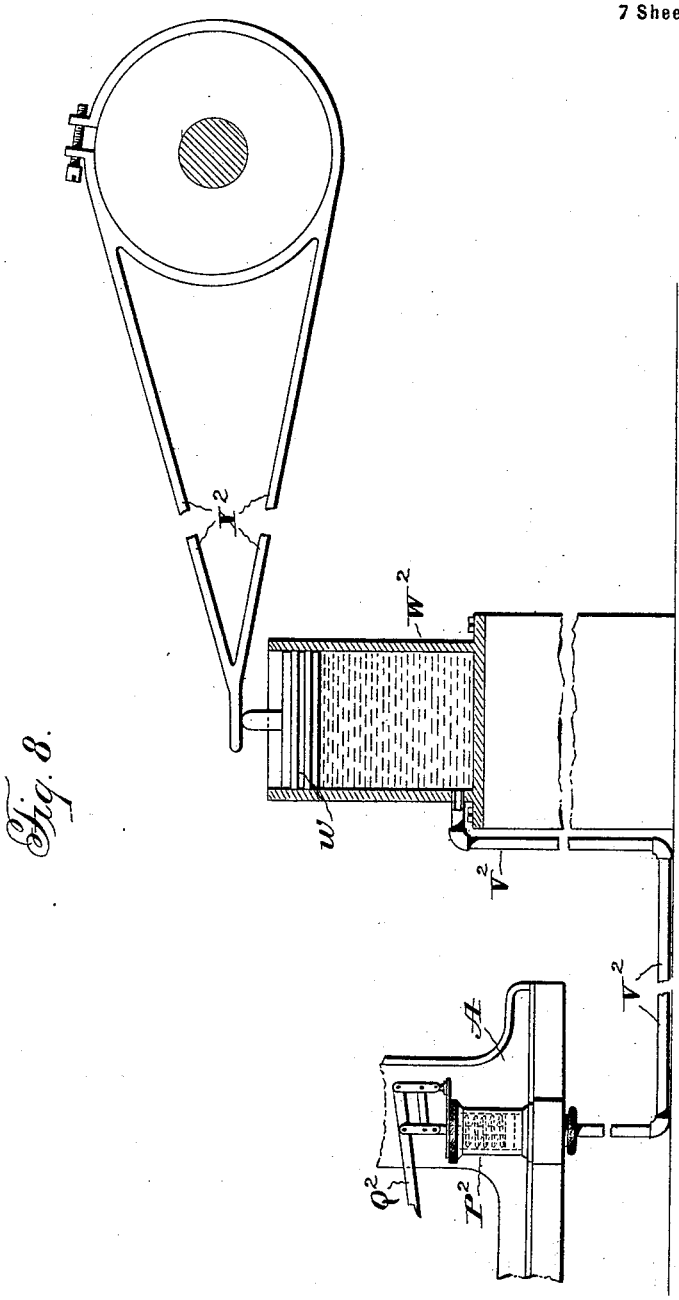

UNITED STATES PATENT OFFICE.

LESTER P. BRECKENRIDGE AND EDD C. OLIVER, OF URBANA, ILLINOIS.

RECORDING-MACHINE.

SPECIFICATION forming part of Letters Patent No. 713,945, dated November 18, 1902.

Application filed February 20, 1902. Serial No. 95,001. (No model.)

*To all whom it may concern:*

Be it known that we, LESTER P. BRECKENRIDGE and EDD C. OLIVER, of Urbana, in the county of Champaign, and in the State of Illinois, have invented certain new and useful Improvements in Recording-Machines; and we do hereby declare that the following is a full, clear, and exact description thereof, reference being had to the accompanying drawings, in which—

Figure 1:
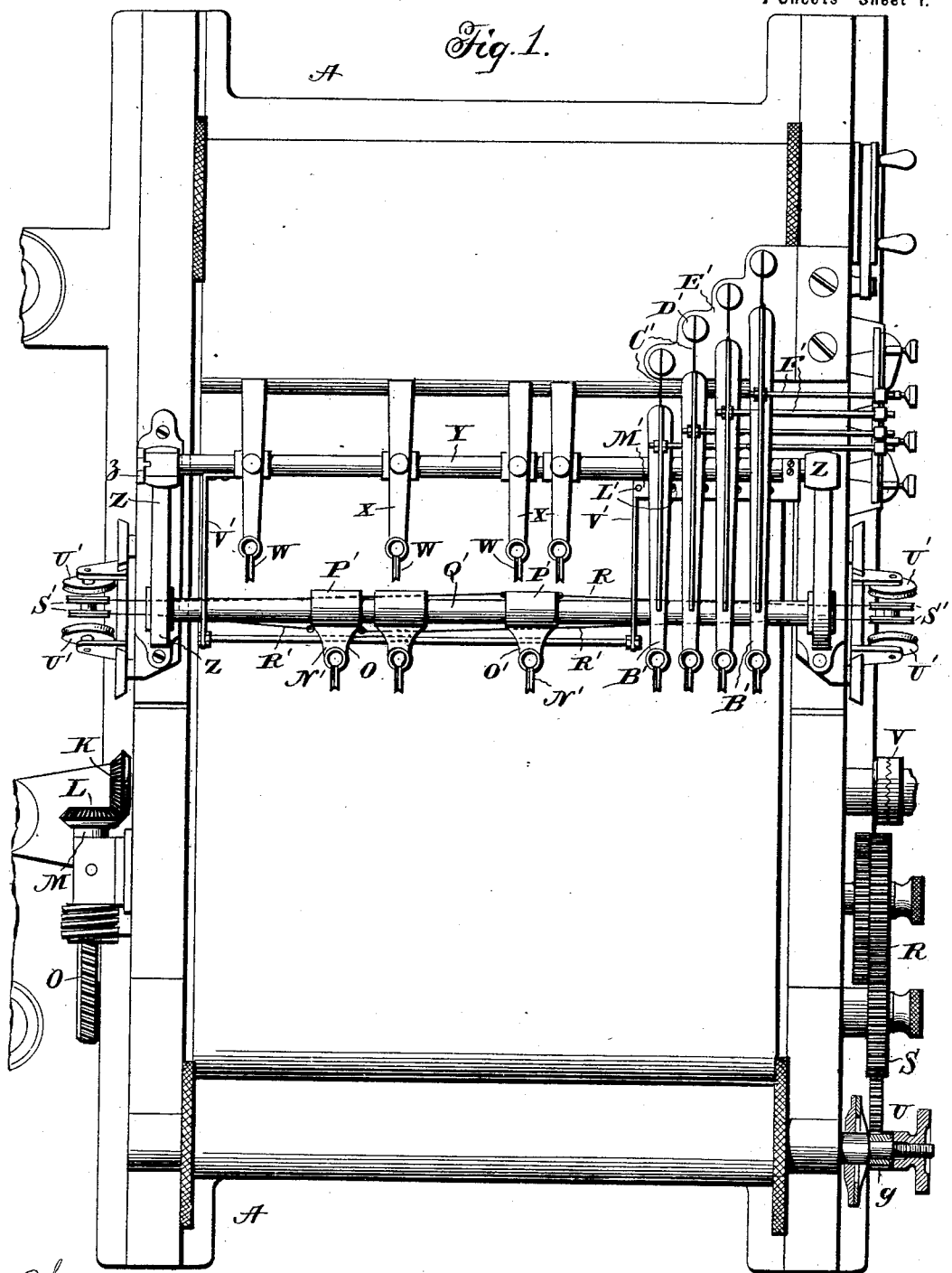
Figure 2:
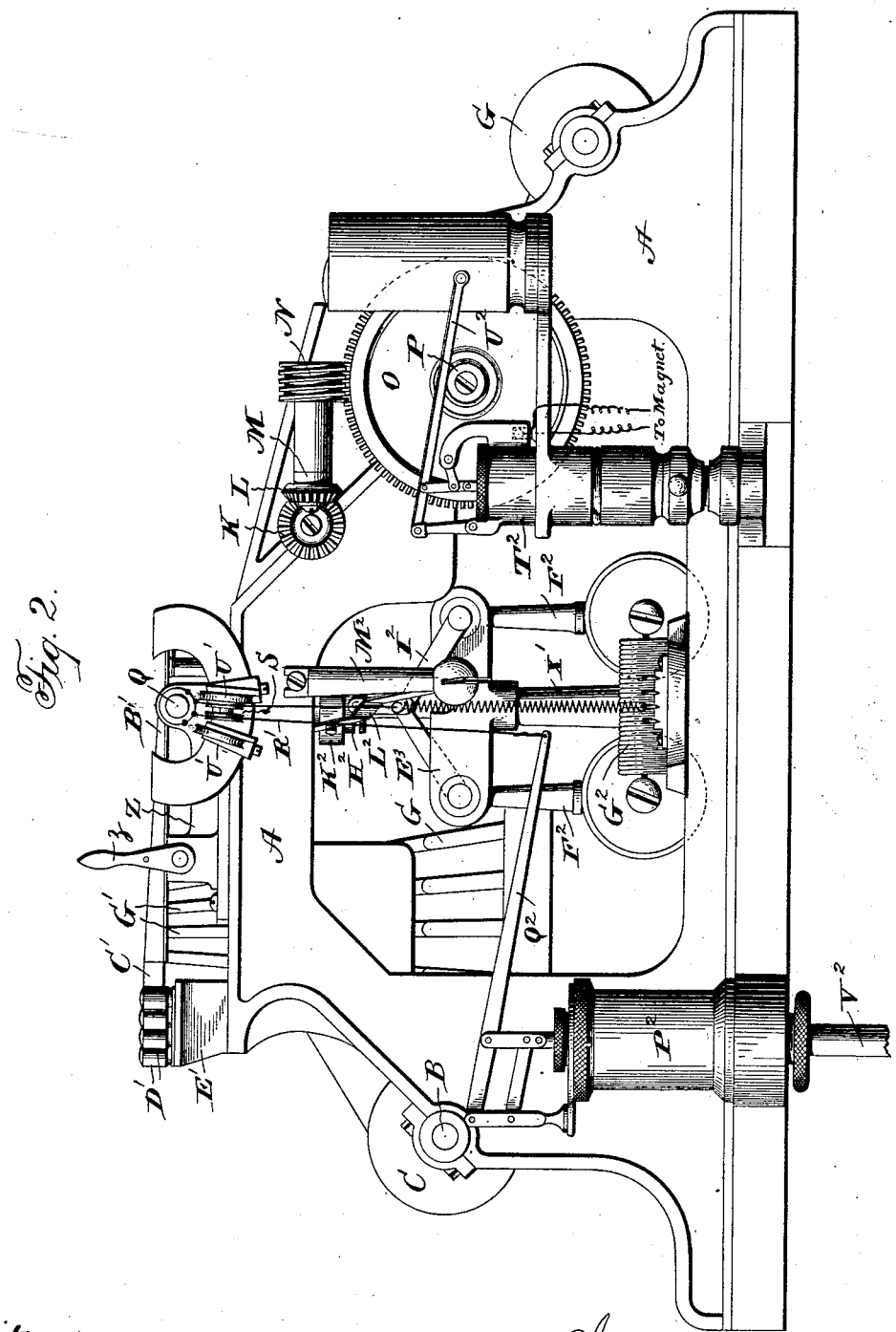
Figure 3:
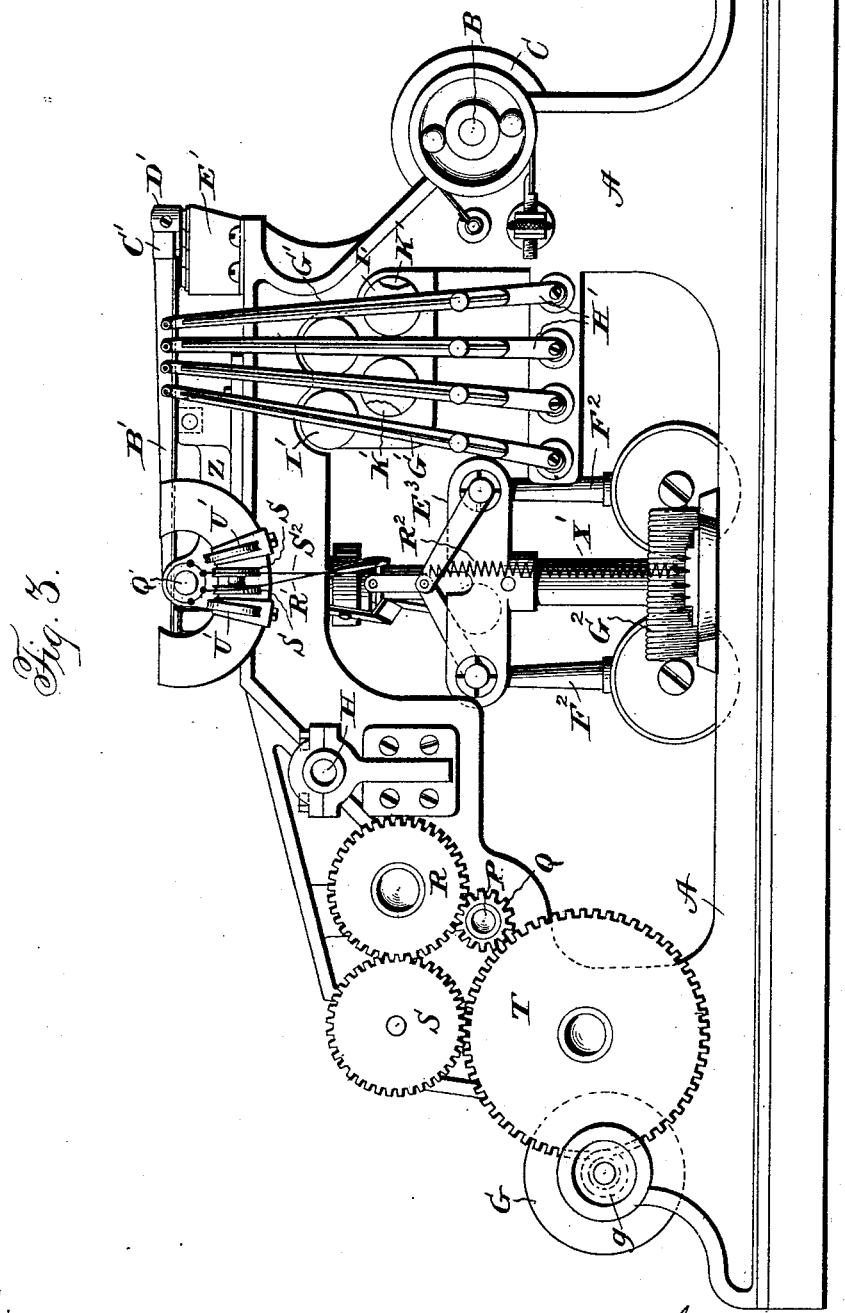
Figure 4:
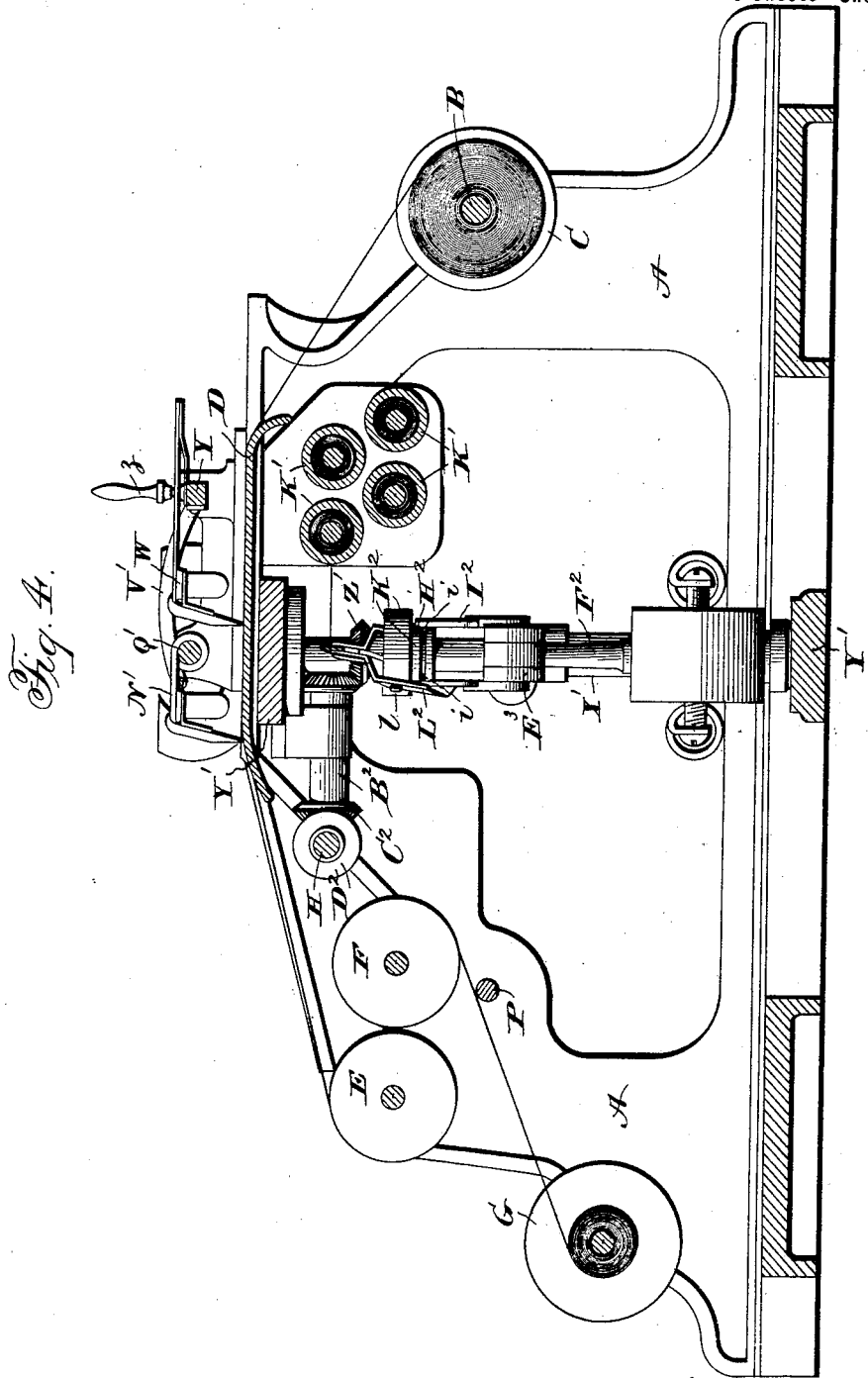
Figure 5:
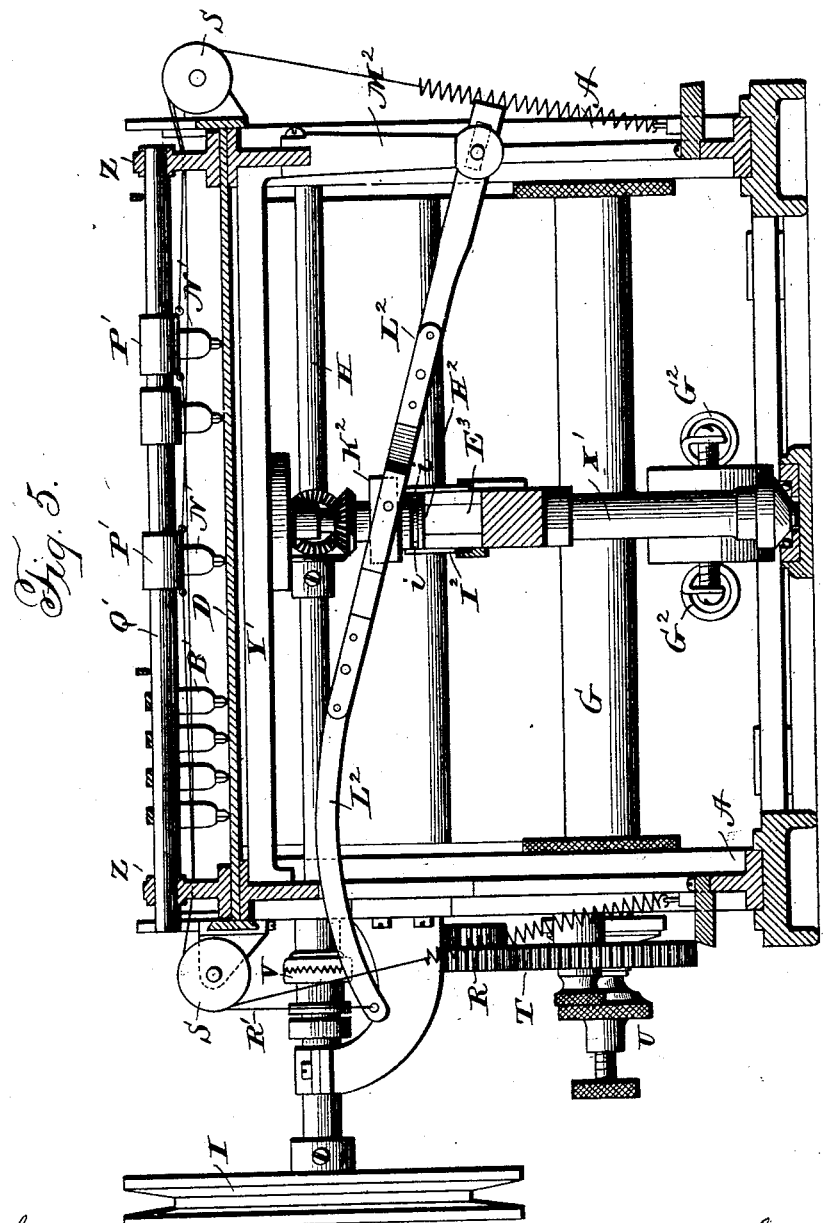
Figure 6:
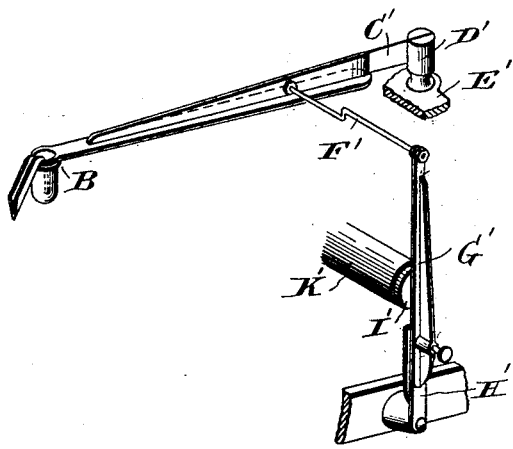
Figure 7:
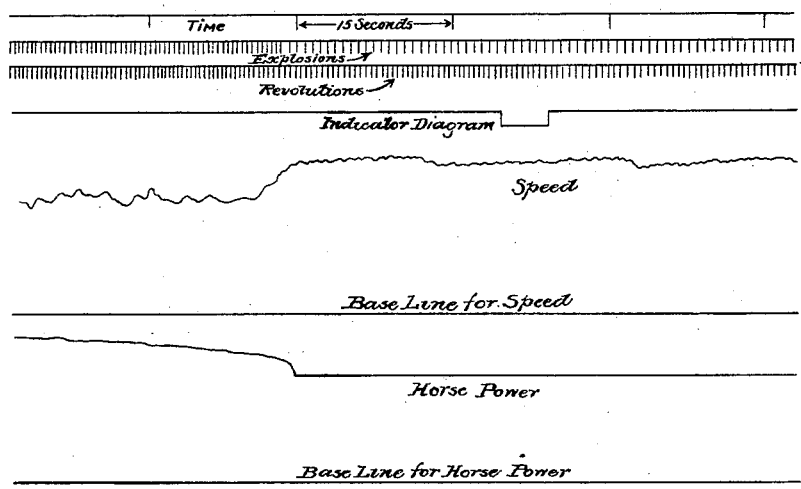

Figure 1 is a top plan view of our recording-machine. Figs. 2 and 3 are elevations of opposite sides of the same. Fig. 4 is a longitudinal vertical section of said machine. Fig. 5 is a transverse section. Fig. 6 is a detail view in perspective of one of the pen-supporting bars and the shifting device therefor. Fig. 7 is a view of a record made by the machine; and Fig. 8 is a view, partly in side elevation and partly in section, of mechanism for making a record of horse-power.

Letters of like name and kind refer to like parts in each of the figures.

The object of our invention is to provide a recording-machine that will automatically make a graphic record of a great variety and number of movements of mechanisms or of other information that may be used as data; and to this end our invention consists in the recording-machine and in the parts thereof constructed substantially as hereinafter specified.

Referring to the drawings, A designates a frame composed of a base and two side pieces. Supported by a shaft B, journaled in suitable bearings in the two side pieces of the frame, is a drum or roll C, on which is wound a supply of paper. From the roll or drum C the paper is carried upward to and over a horizontal plate D, extending between and attached to the two side pieces of the frame A and forming a table or support for the paper, and thence the paper passes successively over rolls E and F at the other end of the frame. From the roll F it passes to a receiving-roll G. At a point between the plate D and the roll F is a shaft H, adapted to be connected by a pulley I thereon or otherwise with the engine or machine to be tested and having at one end a bevel-pinion K, that meshes with a like pinion L on a shaft M, journaled in a bracket *a* on one of the side pieces of the frame A and having a worm N, that meshes with a worm-wheel O on one end of a shaft P. On the other end of said shaft P is a pinion Q, that meshes with a gear R on the shaft of the roll F. The roll-shaft gear R meshes with a gear S on the shaft of roll E. The gear S meshes with an idler T and the latter with a pinion *g* on the shaft of the receiving-roll G. By the gearing described power is taken from the shaft H to drive the rolls E and F to feed the paper and to revolve the roll G to wind the paper thereon. To accommodate or adapt the speed of revolution of the receiving-roll G to the increasing diameter of the paper wound thereon, a friction device U is provided to connect the pinion I with the roll-shaft. For keeping the paper under such tension as is necessary to keep it smooth in passing under the record-making mechanism and to enable the feed-rolls to act properly a friction-brake is applied to the shaft B of the supply-roll C to retard the revolution of the latter, and the friction device U serves the same purpose for the receiving-roll G.

In order to enable the paper-feeding mechanism to be started and stopped at will, the driving-shaft is made in two sections adapted to be connected and disconnected by an ordinary clutch mechanism V.

The recording devices shown comprise a number of pens, some of which are mounted so as to be held stationary while making the record and others are mounted so as to be movable, the latter being actuated from moving parts of mechanism or in connection with or relation to parts or conditions concerning which graphic data are desired.

The pens W and W, that are held stationary while making their records, are mounted in vertical clamp-form sockets on bars X and X, mounted on a shaft or bar Y, that extends across the paper above the same, being supported at its ends in bearings in brackets Z and Z on the two side pieces of the frame A. At one end said shaft has a handle *z*, by which the shaft may be rocked, to lift the pens from the paper when it may be desired.

Certain of the pens that are moved to make their records are respectively mounted in bars B and B', each bar having at one end a vertical clamp-form socket for the pen. At its end opposite that having the pen-socket each bar has riveted or otherwise fastened to it a thin spring-plate C', which is attached to a post D', rising from a bracket E', fastened to the top of one of the side pieces of the frame A and enables the bar to be moved laterally. Each of the pen-supporting bars is connected by a horizontal rod F' to the upper end of a lever G', whose lower end is fastened to one of the frame sides, the lower end of the bar being provided with a thin spring-plate H' to enable the lever to be vibrated. The connection between the rod F' and the pen-supporting bar and between the lever and the rod is a rigid one, and preferably, for sake of adjustment, by threads and clamping-nuts, as shown. Intermediate its ends each lever is connected with the armature I' of an electromagnet K', which when energized causes the lever and the connected pen-bar to move laterally from the position to which they are normally held by the springs C' and H' and by which they are returned to such position when the magnet-circuit is broken. For arresting the bars when moved by the springs there is a stud or pin L' in the path of each, which is attached to and projects from a bar M', lying beneath the bars and supported by the adjacent frame side, to which it is fastened.

It will be seen that neither the bars B' and B' nor the levers G' and G' have pivots embodying joints, and therefore irregularity of action of the pens or other trouble because of looseness of joints, originally or from wear, is avoided.

Other pens N' and N', that are moved to make their records, are placed in clamp-form sockets or bars O' and O', attached to slides P' and P' on a cross bar or shaft Q', that is supported at its ends by the brackets Z and Z. From each slide P' a cord R' runs to the moving part, the extent of whose movement it is desired to record. At each side of the machine pulleys S' and S' are provided, over which the connecting-cords R' and R' are carried, a bracket T' being provided at each side of the machine by which the pulleys thereat are supported. The brackets are in the form of semicircular or U-shaped plates, and preferably there are pulleys U' and U' in addition to the pulleys S' and S', which are adjustable thereon, the plate for this purpose having its edges beveled or being dovetail in cross-section and the pulleys that it is desired to shift to different positions being mounted on arms that are grooved to fit the plates and have set-screws by which they may be held in the desired position. The curvature of the plates is such that the adjustable pulleys U' and U' have their parts to which cords from the pens run always in substantially the same position to whatever point they may be adjusted. The adjustable pulleys are provided to enable cords from the pens N' and N' to be run in such directions as may be required by the positions of the parts whose movements are to be recorded.

For lifting the pens N' and N', which are on the shaft Q', when desired, arms V' and V' are attached to the rock-shaft Y, that support a rail or bar W' beneath the pen-carrying slides P' and P', which rail or bar when the shaft Q' is rocked to lift the same will engage and lift said slides.

As we prefer to construct the pens W and N' each has a groove, preferably V-shaped in cross-section, that extends throughout its length, in the bottom of which lies one or more threads that run lengthwise of the pen and pass from the upper end thereof down into ink receptacles or reservoirs. It will be evident that ink will be drawn from the reservoirs by capillary action. This construction of pen is very desirable, as it enables a fine line to be produced with no danger of blots from excessive quantities of ink from the pen.

For obtaining records of certain tests our machine is provided with a centrifugal governor that is mounted on a vertical shaft X', that has thrust ball-bearings at the top and bottom, respectively, in cross-pieces Y' and Y', fastened to the two frame sides. Near its upper end the shaft has a bevel-pinion Z', which meshes with a like pinion on a horizontal shaft $B^2$, having a second bevel-pinion $C^2$, which meshes with a bevel-pinion $D^2$ on the driving-shaft H. The governor comprises a cross-head $E^3$ and weighted arms $F^2$ and $F^2$, pivoted to opposite ends of the cross-head, the weights of the arms being preferably supplemented by heavy coiled springs $G^2$ and $G^2$, connected to the two weights. On the governor-shaft above the cross-head is a collar $H^2$, slidably mounted thereon, having an annular groove which is engaged by a pin $i$ on a bar $I^2$, connected with each of the governor-arms, so that by the swinging of the arms the collar will be moved along the shaft. On the collar is a flange $K^2$, preferably journaled thereon by a ball-bearing, having an annular groove that is engaged by diametrically opposite pins $l$ and $l$ on a lever $L^2$, that is pivoted at one end to a post or bar $M^2$, fastened to one of the frame sides and at its other end has attached to it one of the cords R'. The pen N', to which the lever $I^2$ is thus connected, is also connected by a cord $N^2$ with a coiled spring $O^2$, that tends to pull or move the pen in the direction opposite that in which it is moved by the lever.

To obtain a line representing pressure, the machine is provided with the cylinder $P^2$ of a steam-engine indicator, the lever $Q^2$ of which is connected by one of the cords R' with the second pen N' on the shaft O', the pen being moved in the opposite direction to that in which it is moved by the lever $Q^2$ by a spring $R^2$, to which it is connected by a cord $S^2$.

A steam-engine indicator $T^2$, the penciloperating lever U² of which is adapted to open and close one of the magnet-circuits, is provided to enable a record to be made showing the period of time in the operation of the engine in which the indicator-diagram is made.

As an illustration of the use of our machine, we will describe its employment in making a record of the test of an Otto gasolene-engine, reference being had to Fig. 7, in which the record of such test is shown. For obtaining the record of the time one of the electromagnets K' is placed in circuit with a clock that makes contact at stated intervals, say, every fifteen seconds. For making the record of explosions another magnet K' is placed in a circuit which is closed at each injection of the gasolene charge, and for recording revolutions a third electromagnet K' is placed in a circuit which is closed at each revolution of the side shaft of the engine, the mark made by the pen on the closing of the circuit thus denoting one cycle or two revolutions of the engine. It will therefore be seen that each time the magnet-circuits are closed the respective pens will be moved laterally, making a short line or mark. When the pencil of the indicator is moved into contact with the paper on which the indicator-diagram is to be made, a circuit is closed through the fourth electromagnet K', which causes the pen controlled by such magnet to swing laterally and to remain in the position to which it is moved as long as the circuit is kept closed by the holding of the indicator-pencil in position to mark the diagram, the record produced being shown at A, Fig. 7. The record of speed is obtained from the pen that is connected with the governor, any movement of the latter produced by a change of speed being recorded by said pen. The base-line for speed is produced by one of the stationary pens W. The line representing horse-power is obtained from the pen N', which is connected with the lever Q² of the cylinder P², the latter being in communication with a hydraulic cylinder, the piston of which is engaged by the brake-arm, so that pressure imposed by the brake, due to friction, will be transmitted to the piston in the cylinder P². The base-line for horse-power is produced by the second stationary pen W.

It will be seen that by our machine all of the records are made on a single sheet and to the same scale, whereby the working up of the data obtained is greatly facilitated and there is a diminution of the possibility of errors.

Having thus described our invention, what we claim is—

1. In a recording-machine, the combination of a bar for supporting a recording device, a support for said bar, a flexible plate connecting the bar and support, an actuating-lever for said bar, a support for said lever, and a flexible plate connecting the lever and its support, substantially as described.

2. In a recording-machine, the combination of a bar for supporting a recording device, a support for said bar, a spring-plate connecting the bar and its support, a lever connected with the bar, a support for the lever, a spring-plate connecting the lever and its support, and a magnet for actuating the lever, substantially as and for the purpose described.

3. In a recording-machine, the combination of a rock-shaft, one or more recording devices thereon, a second shaft or bar, one or more recording devices on the latter, and means actuated by the movement of the rock-shaft for lifting the recording devices on said second shaft or bar, substantially as described.

4. In a recording-machine, the combination of a rock-shaft, one or more recording devices thereon, a second shaft or bar, one or more recording devices on the latter, means for moving said recording devices that are on the second shaft along the same, arms connected with the rock-shaft, and a bar attached to said arms to engage the recording devices on said second shaft or bar to lift the same, substantially as and for the purpose described.

5. In a recording-machine, the combination of a recording device or devices, a roll from which paper is supplied, a paper-receiving roll, means for feeding paper at a uniform speed, means for revolving the paper-receiving roll, and a slip connection between said roll and its driving means, substantially as described.

6. In a recording-machine, the combination of a recording device or devices, a roll from which paper is supplied, a paper-receiving roll, paper-feeding rolls, a driving-shaft, gearing connecting said driving-shaft with said feeding-rolls and said receiving-roll, and a slip connection between the receiving-roll and its driving-gear, substantially as described.

7. In a recording-machine, the combination of one or more recording devices, a roll from which paper is supplied, means for feeding the paper at a uniform speed, a paper-receiving-roll, a driving-wheel, and a friction device for transmitting motion from the wheel to the roll, substantially as described.

8. In a recording-machine, the combination of a movable recording device, a cord for connecting the same with a moving means, a pulley over which the cord passes, and a support for the pulley that is adjustable in a curved path, substantially as described.

In testimony that we claim the foregoing we have hereunto set our hands this 17th day of December, 1901.

LESTER P. BRECKENRIDGE.
EDD C. OLIVER.

Witnesses:
O. E. STAPLES,
W. L. PILLSBURY.